W. R. FROMMATER.
SHOCK ABSORBER.
APPLICATION FILED NOV. 14, 1913.

1,089,830.

Patented Mar. 10, 1914.
2 SHEETS—SHEET 1.

Witnesses:
F. Hogg.
G. Love.

Inventor
Willy R. Frommater
By his Attorney
Carl Goepel

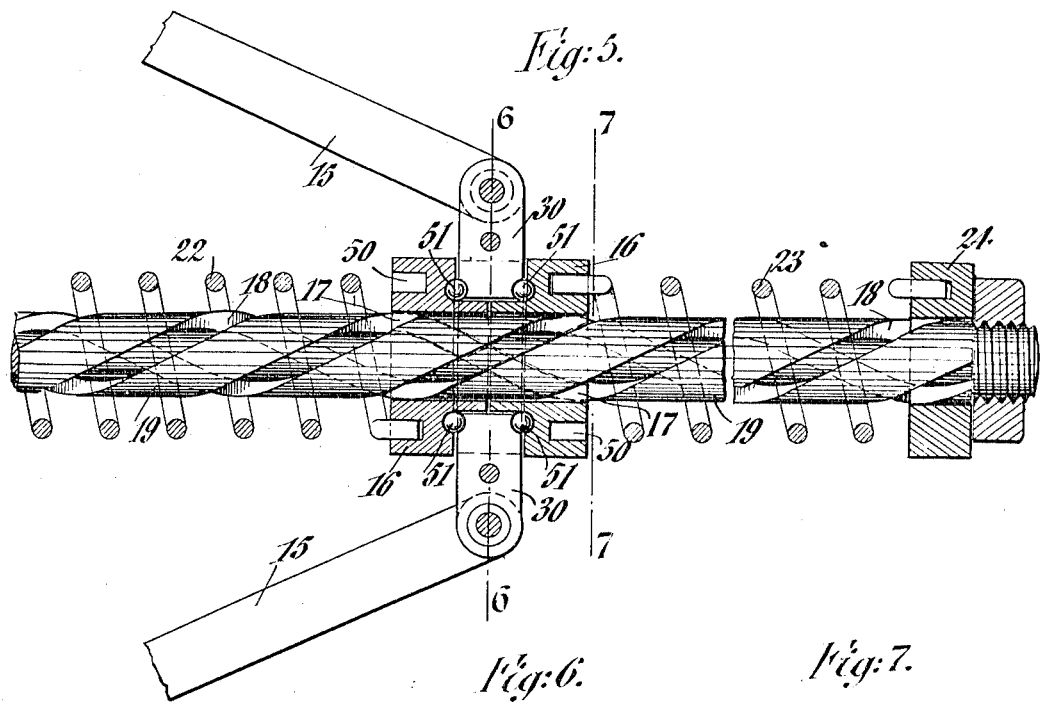
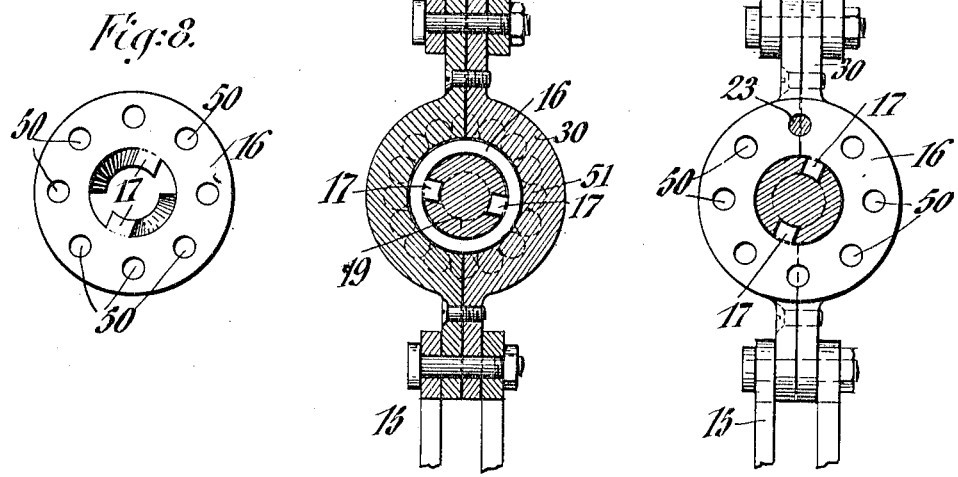

UNITED STATES PATENT OFFICE.

WILLY R. FROMMATER, OF LONG ISLAND CITY, NEW YORK.

SHOCK-ABSORBER.

1,089,830.  Specification of Letters Patent.  Patented Mar. 10, 1914.

Application filed November 14, 1913. Serial No. 800,945.

*To all whom it may concern:*

Be it known that I, WILLY R. FROMMATER, a citizen of the German Empire, and a resident of Long Island City, in the county of Queens and State of New York, have invented certain new and useful Improvements in Shock-Absorbers, of which the following is a specification.

This invention relates to shock-absorbers and has for its object to provide an improved device which will be quick in its action in response to movement applied, and resistant to prevent violent shocks.

For this purpose my invention consists of certain new and useful improvements, which will be more fully described hereinafter and finally pointed out in the claims.

Figure 1:
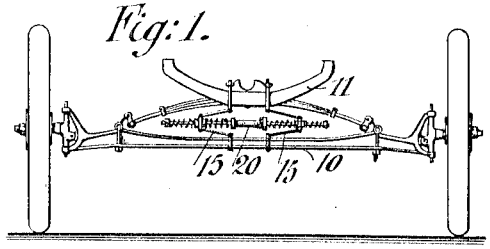
Figure 2:
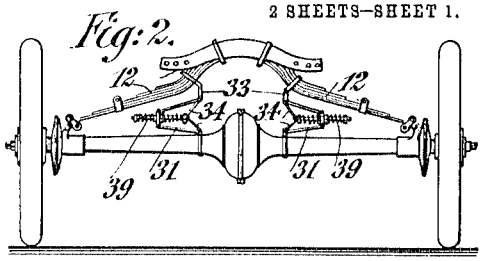
Figure 3:
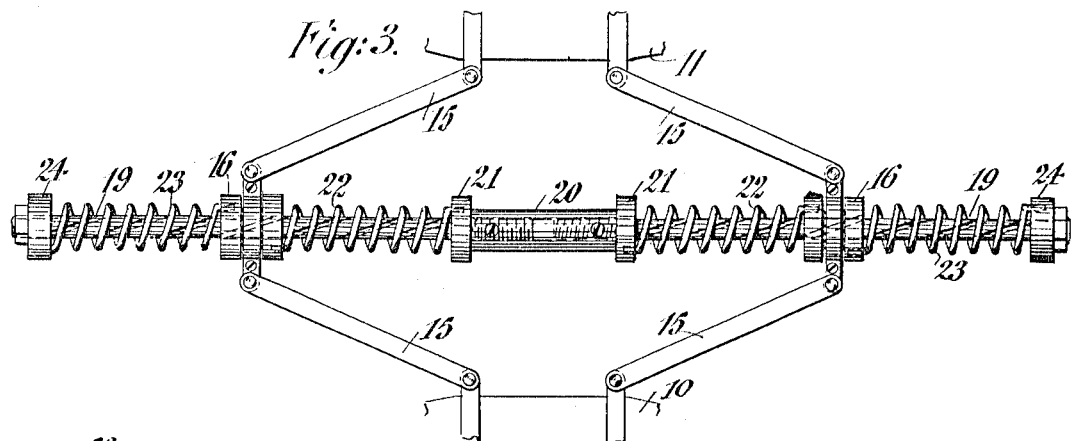
Figure 4:
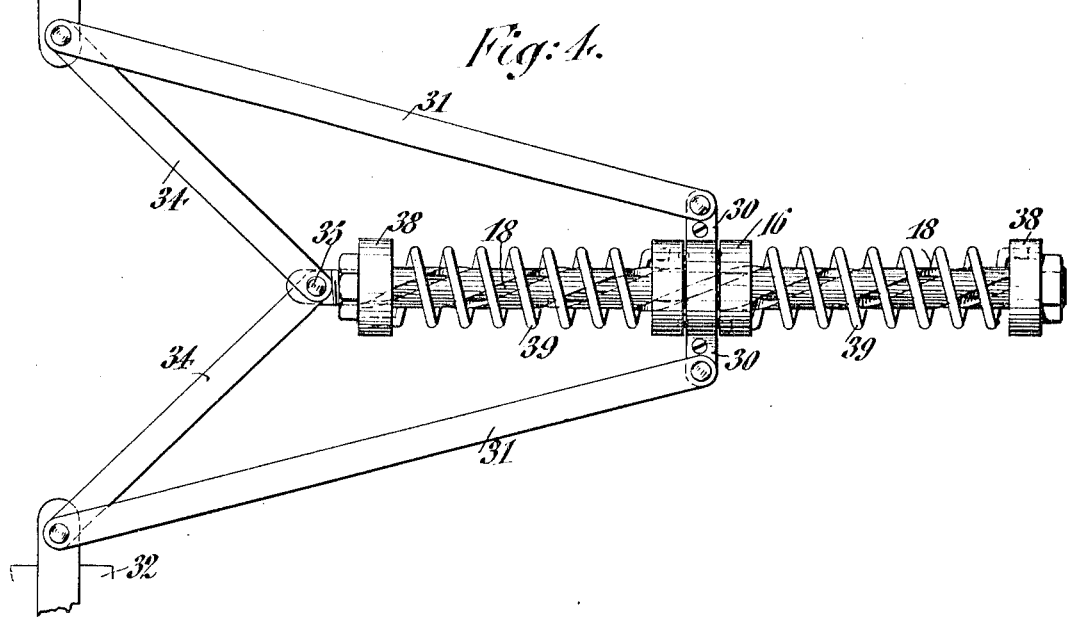

In the accompanying drawing, Figure 1 is a rear-view of an automobile showing one embodiment of the invention applied thereto, Fig. 2 is a rear-view of the rear-axle of the automobile, showing another embodiment of the invention, Fig. 3 is an elevation, on a larger scale, of the device shown in Fig. 1, Fig. 4 is an elevation of the device shown in Fig. 2, Fig. 5 is a vertical longitudinal section of the thrust-rod and connected parts, Figs. 6 and 7 are vertical sections respectively on lines 6 and 7 of Fig. 5, and Fig. 8 is an elevation of the movable sleeve mounted on the thrust-rod.

Similar reference numerals indicate corresponding parts throughout the several figures of the drawing.

Referring to the drawing, and more particularly to Fig. 1, the rear-axle 10 of an automobile is here shown provided with my improved shock-absorber, (this being placed intermediate the axle 10 and frame 11. In Fig. 2, an arrangement of another embodiment is shown, in which the shock-absorber is again shown in the position between the rear-axle and the springs 12.

In Fig. 3, an enlarged view of my improved shock-absorber is shown, in which links 15 are pivoted to the axle 10 and to the frame 11. The ends of these links 15 are also loosely connected to a two-part movable sleeve 16, which is provided with internal lugs 17 adapted to engage the spiral grooves 18 of the thrust-rod or shaft 19. The shaft 19 has an intermediate adjusting device 20 which is screw-threaded to engage the screw-threaded ends of the shaft 19, which intermediate device has shoulders 21 with which the ends of a spiral spring 22 are connected, the other ends of which are connected with the sleeve 16. Against the other sides of the sleeves 16, other spiral springs 23 are arranged, which have their free ends connected with abutments 24 secured to the shaft 19.

In the embodiment shown in Fig. 4, one sleeve 16 is provided which has projecting members 30 which have pivoted rods 31 which have their free ends pivoted to the rear-axle 32 and frame 33 respectively, and have the auxiliary links 34 pivoted at 35 to the rear-end of the shaft 19. This shaft is again provided with spirally-arranged grooves 18, which are engaged by the inwardly-projecting lugs 17 of the sleeve 16, and between the sleeve 16 and end members 38 spiral springs 39 are arranged. Thus, when the links 31 are moved toward each other, and in the case of the structure of Fig. 3, the links 15 are moved toward each other, the sleeve or sleeves 16 are moved toward the end of the shaft or shafts as the case may be. It is necessary, on the one hand, to overcome the tension of one spring and the compression of the other spring, and, on the other hand, for the lugs 17 to move along the spiral grooves, and thereby overcome the friction therewith caused by the torsion of the springs. Thus, by the tension and compression of the springs and their resistance to torsion, any sudden movement is translated into an even and equalized movement and the object of a shock-absorber is accomplished. The sleeves, also the abutments at the ends of the rods, are provided each with a plurality of sockets 50 for the springs, so that the torsion of the springs may be adjusted by placing the spring-end in any one of the sockets, and thereby the resistance of the device adjusted to the point desired. Ball-bearings 51 are inserted between the sleeve 16 and the strap 30, so that the sleeve may always freely turn in the strap.

My improved shock-absorber may be applied to the rear-axle or to any other portion of the automobile and may also find application in wagons or other vehicles, and in all places where it is desired to translate a sudden movement as a shock and to equalize and distribute force. It is uniform in its action, quick to respond, and at the same time able to withstand pressure suddenly applied.

Two embodiments of the invention have been shown and described, but it is obvious that changes may be made therein without departing from the spirit of the invention.

I claim:

1. In a shock-absorber for use between two points of compression in a moving vehicle, a shaft having spiral grooves, a movable sleeve having interiorly-extending lugs engaging the grooves and movable along the shaft, a spring at either side of the sleeve, and members connected with the sleeve for moving the same, said movement necessitating the overcoming of the friction of the lugs in the spiral grooves, and the tension and compression of both springs.

2. In a shock-absorber for use between two points of compression in a moving vehicle, a shaft, spiral grooves in the shaft, a sleeve movable along the shaft and provided with interiorly-extending lugs adapted to engage the grooves, a spring secured to either side of the sleeve, and fixed abutments on the shaft to which the free ends of the springs are secured.

3. A shock-absorber, comprising two members threaded together, a helical spring fixed at one end to one member and at the other end to the other member, means for preventing rotation of one of said members, and motion-transmitting means for connecting the other member with the source of shock.

In testimony that I claim the foregoing as my invention, I have signed my name in presence of two subscribing witnesses.

WILLY R. FROMMATER.

Witnesses:
  F. HOGG,
  G. LOWE.